United States Patent [19]

Arai et al.

[11] Patent Number: 5,304,323
[45] Date of Patent: Apr. 19, 1994

[54] LIQUID CRYSTAL DEVICES AND PROCESS FOR PRODUCING THE SAME

[75] Inventors: Yoshi Arai; Toru Fujisawa, both of Saitama; Kiyohumi Takeuchi; Haruyoshi Takatsu, both of Tokyo; Koichiro Adachi; Hiroshi Ogawa, both of Chiba; Kazunori Maruyama, Tokyo, all of Japan

[73] Assignees: Dainippon Ink and Chemicals, Inc., Tokyo; Kawamura Institute of Chemical Research, Sakura, both of Japan

[21] Appl. No.: 984,279

[22] Filed: Dec. 1, 1992

Related U.S. Application Data

[63] Continuation of Ser. No. 759,766, Sep. 13, 1991, abandoned, which is a continuation of Ser. No. 259,635, Oct. 19, 1988, abandoned.

[30] Foreign Application Priority Data

Oct. 20, 1987 [JP] Japan .................. 62-264533
Apr. 1, 1988 [JP] Japan .................. 63-80439
Sep. 19, 1988 [JP] Japan .................. 63-234383
Sep. 22, 1988 [JP] Japan .................. 63-238184

[51] Int. Cl.$^5$ .................. C09K 19/54; C09K 19/52; G02F 1/13
[52] U.S. Cl. .................. 252/299.5; 252/299.01; 252/299.61; 359/51; 359/52
[58] Field of Search ........ 252/299.01, 299.5, 299.61; 359/53, 51, 52, 102

[56] References Cited

U.S. PATENT DOCUMENTS

| | | | |
|---|---|---|---|
| 3,687,515 | 8/1972 | Haas et al. | 252/299.01 |
| 3,803,050 | 4/1974 | Haas et al. | 252/299.01 |
| 4,631,328 | 12/1986 | Ringsdorf et al. | 252/299.01 |
| 4,707,080 | 11/1987 | Fergason | 252/299.5 |
| 4,834,509 | 5/1989 | Gunjima et al. | 252/299.5 |
| 4,834,904 | 5/1989 | Krause et al. | 252/299.01 |
| 4,850,683 | 7/1989 | Kawaguchi et al. | 350/350 R |
| 4,884,877 | 12/1989 | Fergason | 252/299.5 |
| 4,888,126 | 12/1989 | Mullen et al. | 252/299.5 |
| 4,898,454 | 2/1990 | Buckley et al. | 252/299.01 |
| 5,089,904 | 2/1992 | Fergason | 359/52 |

OTHER PUBLICATIONS

Ringsdorf et al., Makromol. Chem. Rapid Commun., vol. 3, 1982, pp. 745-751.

*Primary Examiner*—Philip Tucker
*Attorney, Agent, or Firm*—Armstrong, Westerman, Hattori, McLeland & Naughton

[57] ABSTRACT

A liquid crystal device comprising a pair of substrate, at least one of them being transparent, and a light-control layer supported therebetween, wherein said light-control layer comprises a liquid crystal material showing positive dielectric anisotropy and a transparent solid substance, said liquid crystal material forming a continuous phase, and said transparent solid substance existing in said continuous phase in the form of dispersed particles or a three-dimensional network. The device exhibits a clear threshold voltage, a high fast response time and a highly contrast display with a low applied voltage.

10 Claims, 1 Drawing Sheet

LIQUID CRYSTAL DEVICES AND PROCESS FOR PRODUCING THE SAME

This application is a continuation of application Ser. No. 07/759.766 filed Sep. 13, 1991 now abandoned which was a continuation of application Ser. No. 07/259.635 filed Oct. 19, 1988, now abandoned.

FIELD OF THE INVENTION

This invention relates to a liquid crystal device capable of making a large area and a process for producing the same. More particularly, it relates to a liquid crystal device in which visual field control (i.e., cutoff or opening of a field of view) or light control (i.e., transmission or screening of light) can be effected electrically or thermally. The device of the present invention is useful as a screen for cutting a view or a curtain for light control in windows of buildings or show-windows. The device is also useful as a display such as an advertising panel a guiding panel, a decorative display plate, etc. on which letters or figures are displayed and changed electrically or thermally at a fast response time.

BACKGROUND OF THE INVENTION

Liquid crystal display elements now in practical use include twisted nematic (TN) mode and super twisted nematic (STN) mode. Display cells utilizing ferroelectric liquid crystals have also been proposed. These display cells essentially contain a polarizing sheet and requires orientation treatment.

There is also known a process for producing a liquid crystal device capable of making a large, bright, and high contrast display at low cost without requiring a polarizing sheet or orientation treatment, in which a polymer matrix having dispersed therein an encapsulated liquid crystal material is formed into a thin film (hereinafter referred to as polymer encapsulated type device) as disclosed in JP-A-58-501631 (the term "JP-A" as used herein means an "unexamined published Japanese patent application") and U.S. Pat. No. 4,435,047. The encapsulizing material proposed includes gelatin, gum arabic, polyvinyl alcohol, etc.

According to this technique, when liquid crystal molecules encapsulized with polyvinyl alcohol exhibit positive dielectric anisotropy in a film, they are oriented in the direction of an electric field in which they are placed, and exhibits transparency if a refractive index $n_O$ of the liquid crystal is equal to a refractive index $n_p$ of the polymer. On removal of the electric field, the liquid crystal molecules are not aligned and the refractive index of the liquid crystal droplets is shifted from $n_O$ As a result, light is scattered at an interface cf liquid crystal droplets and inhibited from transmission to make the film white turbid.

There are several other proposals using a polymer film having dispersed therein microcapsulated liquid crystal droplets. For example, JP-A-61-502128 discloses liquid crystals dispersed in an epoxy resin, and JP-A-622231 discloses liquid crystals dispersed in a specific ultraviolet-cured polymer.

In these polymer-encapsuled type devices, since the electric field effect is exerted on the liquid crystal droplets via the polymer matrix, a high drive voltage is required to change the liquid crystal molecule alignment, which has caused various problems on practical use.

Further, in order to achieve sufficient transparency on application of an electric field, special care should be taken in selecting the liquid crystal and the polymer so that they may have refractive indices approximate to each other.

Furthermore, it is difficult to achieve a large display by means of a multiplexing because there exists no threshold voltage which is necessary for realizing such a display.

These disadvantages have been a serious hindrance to putting large-area liquid crystal devices into practical use.

SUMMARY OF THE INVENTION

In the light of the aforesaid problems waiting for solution, one object of this invention is to provide a liquid crystal device which can be driven at a low voltage and provides a high contrast display.

Another object of this invention is to provide a process for producing such a liquid crystal device.

As a result of extensive investigations, it has now been found that the above objects can be accomplished by a liquid crystal device, in which a liquid crystal material forms a continuous phase between a pair of substrates and a transparent solid component is present in the liquid crystal continuous phase to constitute a light-scattering interface between the liquid crystal material.

That is, the present invention relates to a liquid crystal device comprising a pair of substrates, which may have an electrode layer, at least one of them being transparent, and a light-control layer supported between the substrates, wherein said light-control layer comprises a liquid crystal material showing positive dielectric anisotropy and a transparent solid substance, said liquid crystal material forming a continuous phase, and said transparent solid substance existing in said liquid crystal material in the form of particles or three-dimensional network.

The present invention further relates to a process for producing the above-described liquid crystal device which comprises introducing a mixture comprising a liquid crystal material showing positive dielectric anisotropy and a polymerizable composition between a pair of substrates, which may have an electrode layer, at least one of them being transparent, and then polymerizing said polymerizable composition.

BRIEF DESCRIPTION OF THE ACCOMPANYING DRAWINGS

DETAILED DESCRIPTION OF THE INVENTION

Figure 1:
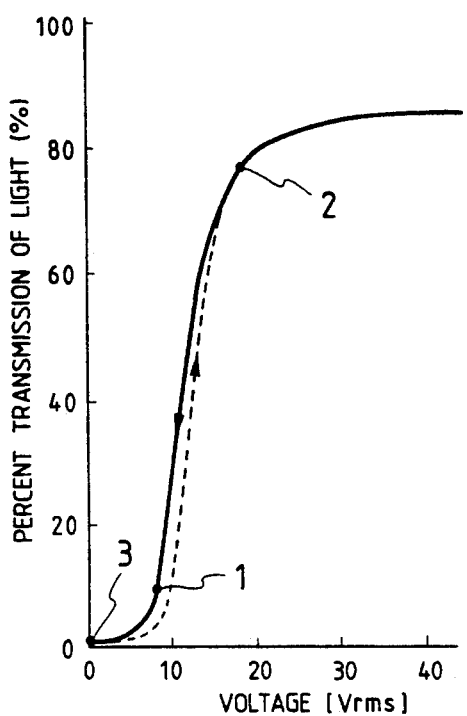
FIG. 1 is a graph of applied voltage (room mean square) vs. percent transmission of light in the liquid crystal device according to the present invention.

The base which can be used in the present invention may be either rigid material such as glass and metals or soft material such as plastic films. A pair of substrates face to each other with an appropriate gap therebetween. In general, the gap between the substrates is preferably held by means of a spacer commonly employed in well-known liquid crystal devices.

At least one of the two substrates should be transparent so that the liquid crystal supported therebetween could be seen from the outside. The transparent substrate is not essentially required to be completely transparent. In cases where the liquid crystal device is designed to act by light transmitted from one side of the device to the other side, both substrates should have adequate tranparency. If desired, an appropriate electrode either transparent or opaque may be provided on a part or the entire surface of the substrate.

Between the two substrates are supported a liquid crystal material and a transparent solid component. The liquid crystal material to be used need not be a single liquid crystal compound and may be a mixture of two or more liquid crystal compounds or a mixture containing substances other than liquid crystal compounds. That is, any of liquid crystal materials commonly recognized in the art can be employed in the present invention as far as it exhibits positive dielectric anisotropy. In particular, liquid crystal materials having a dielectric anisotropy ($\Delta\epsilon$) of 8 or more and a birefringence ($\Delta n$) of 0.1 or more are preferred. Further, the liquid crystal material preferably includes nematic liquid crystals, smectic liquid crystals, and cholesteric liquid crystals, with nematic liquid crystals being preferred. The liquid crystals to be used may be appropriately selected from commercially available liquid crystal materials. Specific examples of usable liquid crystal compounds are shown below.

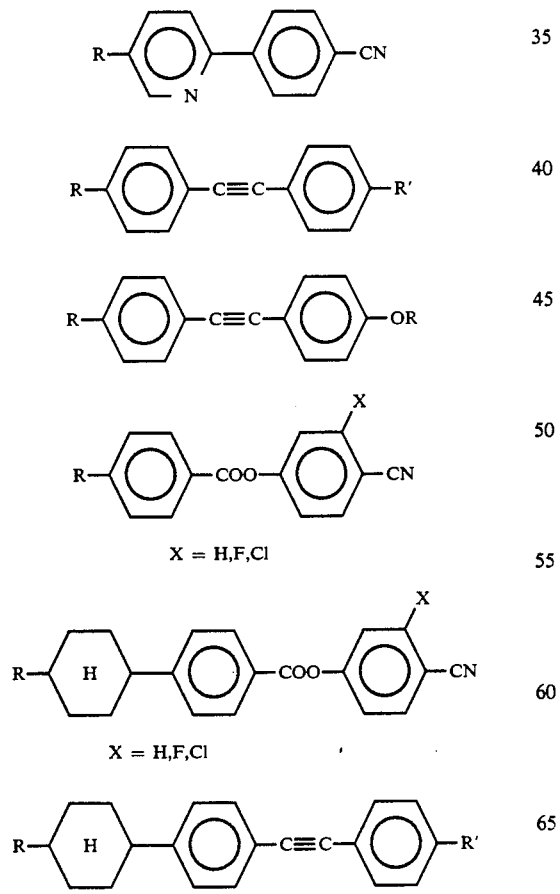

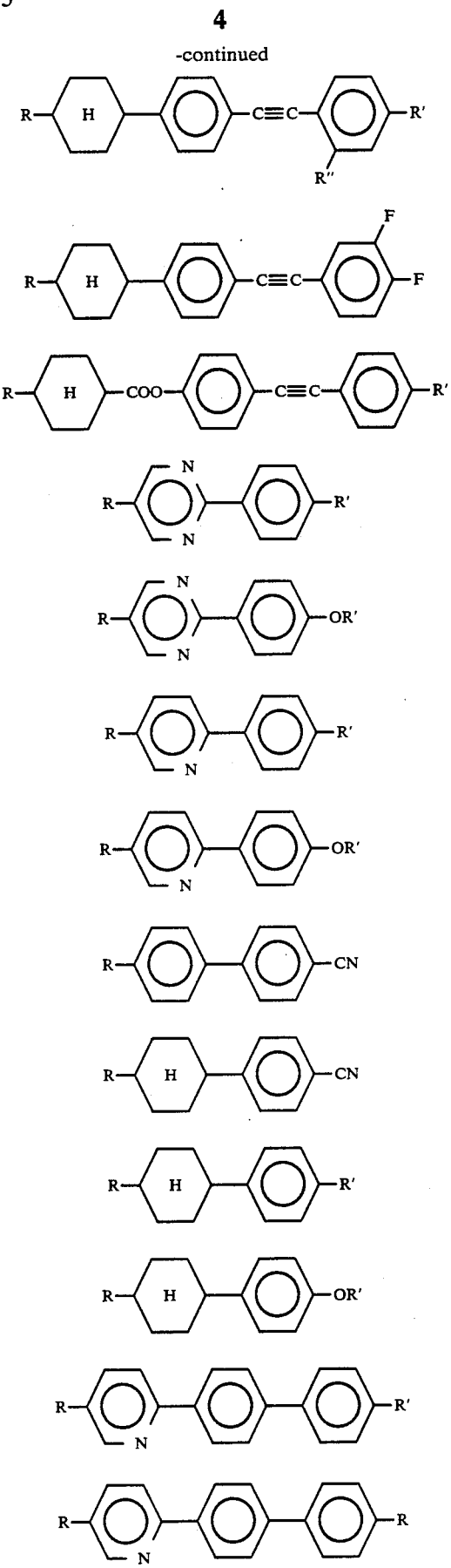

5
-continued
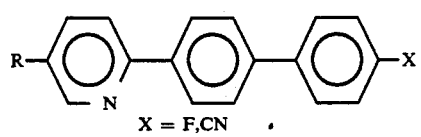
X = F, CN
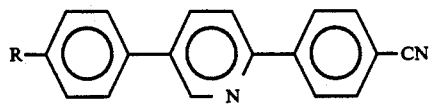
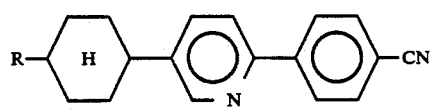
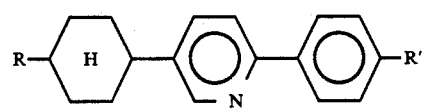
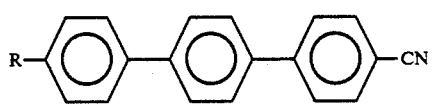
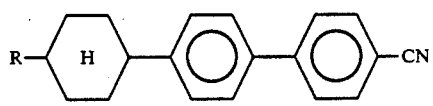
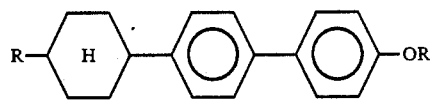
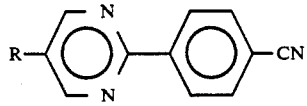
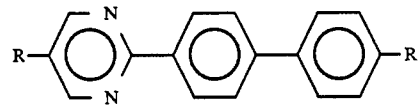
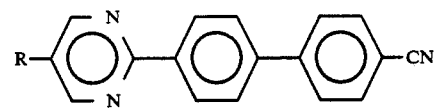
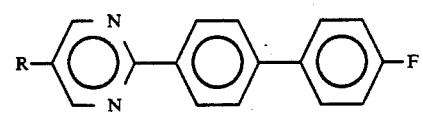
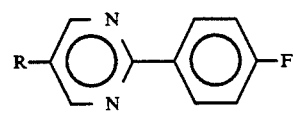
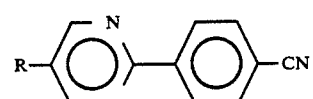
6
-continued
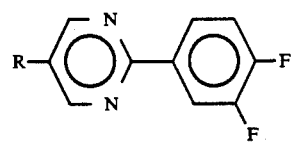
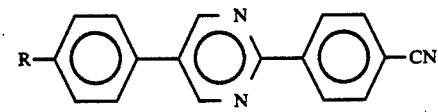
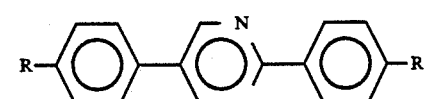
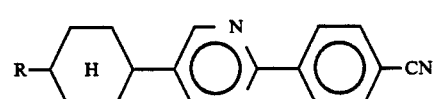
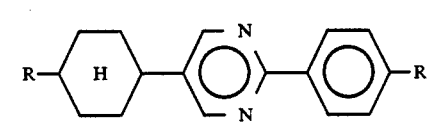
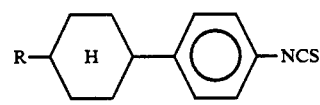
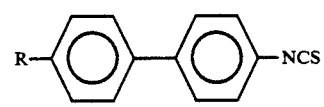
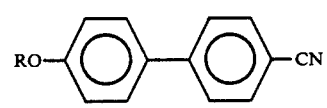
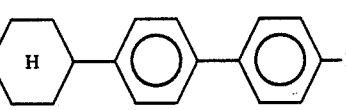
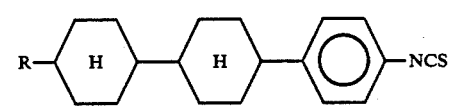
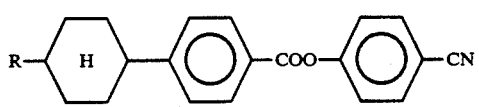
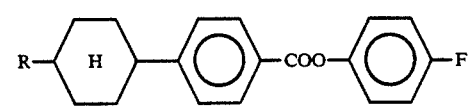
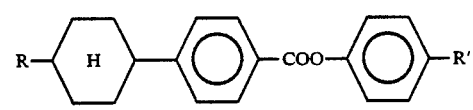

-continued

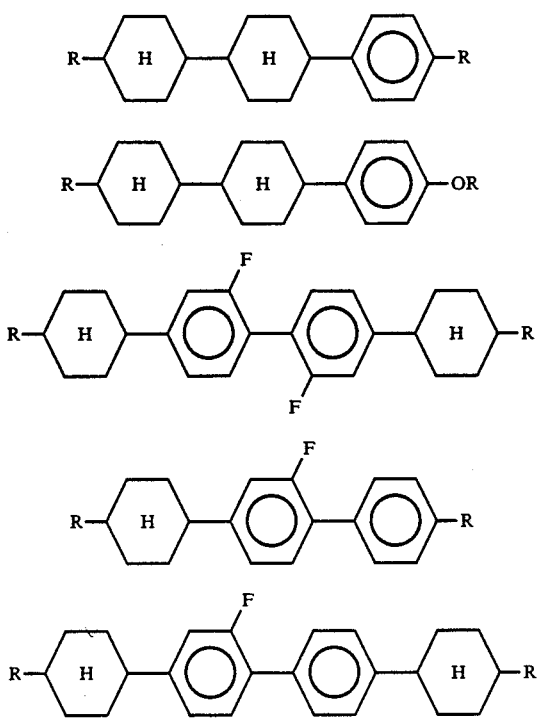

In the above compounds, R and R' each represents an alkyl group having from 1 to 10 carbon atoms; and R" represents a fluorine atom or a methyl group.

If desired, a chiral component may be used in combination with these liquid crystal materials.

Of these liquid crystal materials, particularly, in terms of a response rate and contract of the liquid crystal device, preferred are those containing a compound of formula (I):

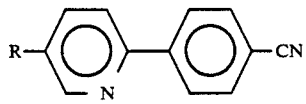

(I)

wherein R represents a straight chain alkyl group having from 1 to 10 carbon atoms, and/or a compound of formula (II):

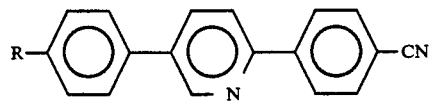

(II)

wherein R represents a straight chain alkyl group having from 1 to 10 carbon atoms.

The proportion of the liquid crystal material in the light-control layer is preferably 60% by weight or more, more preferably in the range of from 70 to 90% by weight. If the proportion of the liquid crystal material is too small, there is a tendency toward difficulty in forming a continuous phase of the liquid crystal material between the two bases. However, even if the proportion of the liquid crystal material is less than 60% by weight, it is possible for the liquid crystal material to form a continuous phase by appropriately selecting a kind of a polymerizable compound which provides the transparent solid substance or curing conditions of the polymerizable compound.

The transparent solid substance present in the continuous phase of the liquid crystal material includes those dispersible in the form of particles and those having a three-dimensional network structure, with the latter being preferred. In either case, this component functions to form an optical interface with the liquid crystal material, which is essential for achieving light scattering. Transparency of the transparent solid component can be determined depending on the end-use of the device. The term "solid" as used herein is meant to include not only rigid and hard substances but also flexible, soft or elastic substances as far as they meet the purpose. In the case of using particulate solid substance, the particle size or shape may be selected appropriately depending on the purpose unless the particle size is too large or too small as compared with light wavelengths.

The transparent solid component preferably includes synthetic resins providing a three-dimensional network structure. Synthetic resins which are ultraviolet cured are particularly preferred.

The above-described liquid crystal device according to the present invention can be produced by a novel and very unique process comprising introducing a mixture comprising a liquid crystal material showing positive dielectric anisotropy and a polymerizable composition between a pair of substrates, each of which may have an electrode layer, at least one of them being transparent, and polymerizing said polymerizable composition to form a light-control layer.

The polymerizable composition to be used in the process comprises a polymerizable compound and a polymerization initiator and, if necessary, a chain transfer agent, a photosensitizer, etc.

Any polymerizable compound can be used as long as it forms a three-dimensional network in the continuous phase of the liquid crystal material upon polymerization. Specific examples of such a polymerizable compound are styrene, chlorostyrene, α-methylstyrene, divinylbenzene; acrylates, methacrylates or fumarates having a substituent, e.g., methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, allyl, methallyl, glycidyl, 2-hydroxyethyl, 2-hydroxypropyl, 3-chloro-2-hydroxypropyl, dimethylaminoethyl, diethylaminoethyl, etc.; mono(meth)acrylates or poly(meth)acrylates of ethylene glycol, polyethylene glycol, propylene glycol, polypropylene glycol, 1,3-butylene glycol, tetramethylene glycol, hexamethylene glycol, neopentyl glycol, trimethylolpropane, glycerin, pentaerythritol, etc.; vinyl acetate, vinyl butyrate, vinyl benzoate, acrylonitrile, cetyl vinyl ether, limonene, cyclohexene, diallyl phthalate, diallyl isophthalate, 2-, 3- or 4-vinylpyridine, acrylic acid, methacrylic acid, acrylamide, methacrylamide; N-hydroxymethylacrylamide or N-hydroxyethylmethacrylamide or alkyl ether compounds thereof: diol di(meth)acrylates obtained by adding at least 2 mols of ethylene oxide or propylene oxide to 1 mol of neopentyl glycol, triol di- or tri(meth)acrylates obtained by adding at least 3 mols of ethylene oxide or propylene oxide to 1 mol of trimethylolpropane, diol di(meth)acrylates obtained by adding at least 2 mols of ethylene oxide or propylene oxide to 1 mol of bisphenol A, a reaction product obtained by reacting 1 mol of 2-hydroxyethyl(meth)acrylate and 1 mol of phenyl isocyanate or n-butyl isocyanate, poly(meth)acrylate of dipentaerythritol, and the like. Preferred of them are those containing at least two acrylic double bonds, e.g., trimethylolpropane triacrylate, tricyclodecanedimethylol diacrylate, polyethylene glycol diacrylate, polypropylene glycol diacrylate, hexanediol diacrylate, neopentyl glycol diacrylate, tris(acryloxyethyl)isocyanurate, caprolactone-modified hydroxypivalic acid ester neopentyl glycol diacrylate, etc.

The polymerization initiator to be used includes 2-hydroxy-2-methyl-1-phenylpropan-1-one ("Darocure 1173" produced by Merck Co.), 1-hydroxycyclohexyl phenyl ketone ("Irgacure 184" produced by Ciba Geigy), 1-(4-isopropylphenyl)-2-hydroxy-2-methylpropan-1-one ("Darocure 1116" produced by Merck Co.), benzyldimethylketal ("Irgacure 651" produced by Ciba Geigy), 2-methyl-1-[4-(methylthio)-phenyl]-2-morpholinopropanone-1 ("Irgacure 907" produced by Ciba Geigy), a mixture of 2,4-diethylthioxanthone ("Kayacure DETX" produced by Nippon Kayaku Co., Ltd.) and ethyl p-dimethylaminobenzoate ("Kayacure EPA" produced by Nippon Kayaku), a mixture of isopropylthioxanthone ("Quantacure ITX" produced by Ward Blenkinsop) and ethyl p-dimethylaminobenzoate, and the like. From the standpoint of compatibility with liquid crystal materials, more preferred among them is liquid 2-hydroxy-2-methyl-1-phenylpropan-1-one.

If desired, the mixture providing a light-control layer may further contain a chain transfer agent, a photosensitizer, a dye, a crosslinking agent, and so on as selected in conformity with the kinds of the polymerizable compound (monomer or oligomer) or desired performances of the device.

In particular, a combined use of a chain transfer agent produces a marked effect, though dependent on the kind of the polymerizable compound, in preventing excessive crosslinking of the resin to ensure sensitive response of the liquid crystal material to applied electric field and to thereby exhibit excellent display characteristics at a low drive voltage. Preferred examples of the chain transfer agent are butanediol dithiopropionate, pentaerythritol tetrakis($\beta$-thiopropionate), and triethylene glycol dimercaptan. The amount of the chain transfer agent to be added varies depending on the kind of the polymerizable compound. A too small amount brings about little effects, and a too large amount tends to reduce transparency of the device, resulting in deteriorated contrast of the display. A recommended effective amount of the chain transfer agent ranges from about 0.05 to 30% by weight, preferably from 0.1 to 20% by weight, based on the polymerizable compound.

The mixture comprising the above-enumerated components and forming a light-control layer can be introduced between the two bases by infusion into the gap or coating on one of the bases by means of a coater, e.g., a spinner, and then laminating the other base thereover.

The thickness of the light-control layer is usually adjusted in a range of from 5 to 30 $\mu$m.

When the mixture containing the liquid crystal material and the polymerizable compound is in the state of isotropic liquid, the polymerizable compound and the liquid crystal material are miscible with each other, with the latter being uniformly dissolved in the mixture. However, when the mixture in this state is cooled, it undergoes phase transfer to a liquid crystal phase whereby the solubility of the liquid crystal material in the polymerizable compound decreases, and the polymerizable compound and the liquid crystal material are liable to separate from each other. For example, when a pyridine type liquid crystal composition whose nematic-isoropic transition temperature (hereinafter referred to as N-I point) is 68.5° C. is mixed with 10% by weight or 20% by weight of caprolactone-modified hydroxypivalic acid ester neopentyl glycol diacrylate as a polymerizable compound, the N-I point decreases to 51° C. or 32° C., respectively. Measurement of N-I transition enthalpy ($\Delta H$) in the cooling process by the use of a differential calorimeter revealed that $\Delta H$ of the pyridine type liquid crystal composition alone is 0.34 cal/g whereas $\Delta H$ of the composition to which 20% by weight of the above-described polymerizable compound has been added is 0.13 cal/g, that is, the $\Delta H$ value also decreases by influences of the concentration of the polymerizable compound. This indicates that the liquid crystal material in the state of an isotropic phase is miscible with the polymerizable compound.

On a polarizing microscopic observation of the texture of the light-control layer-forming mixture, it was confirmed that phase transfer of the solution from an isotropic phase to a nematic phase causes separation of the polymerizable compound from the nematic phase, indicating that the solubility of the nematic phase in the polymerizable compound decreases.

According as the polymerizable composition between the substrates is polymerized to cause phase separation, the polymerizable composition decreases and, at the same time, the N-I point of the mixture material rises to transfer it to a nematic phase. The phase separation of the polymerizing composition from the mixture can thus be further accelerated.

In other words, in a preferred embodiment of the process according to the present invention, the polymerizable composition is polymerized while undergoing phase separation from the liquid crystal material by making use of a difference in solubility of the liquid crystal material in the polymerizable composition between an isotropic liquid phase and a nematic liquid crystal phase to thereby form a transparent solid substance having a three-dimensional network structure in the continuous phase of the liquid crystal material.

Curing or polymerization of the polymerizable composition in the light-control layer-forming mixture can be preferably carried out by irradiating ultraviolet light having an intensity of 10 mJ/cm$^2$ or more or 3 mW/cm$^2$ or more through a transparent base. Depending on the kind of the polymerizable composition or other optional components, the ultraviolet radiation may be replaced with thermal or electron beams.

In the case of ultraviolet curing, it is preferable to irradiate the surface of the substrate uniformly with ultraviolet rays having a constant intensity. Ultraviolet irradiation may be conducted all at once or divided in several times. Thus, there can be formed in the liquid crystal continuous phase a transparent solid substance in the form of a three-dimensional network having a uniform mesh size.

The mesh size of the network preferably in the range of from 0.5 to 2 $\mu$m. By virtue of the three-dimensional network structure having a uniform mesh size in the liquid crystal continuous phase, the liquid crystal device of the present invention exhibits a high contrast display and has a clear threshold voltage, thus making it possible to display letters or figures with excellent display characteristics by dot matrix electrode construction according to matrix addressing using an A-line-at-a-time scanning system. Namely, the multiplexing drive system can be realized by formation of the transparent solid substance in the form of a three-dimensional network having a uniform mesh size in the liquid crystal continuous phase.

It is preferable to cure the polymerizable composition while the liquid crystal material is in the isotropic phase, i.e., at a temperature ranging from the N-I point of the light-control layer-forming mixture and the N-I point of the liquid crystal material per se. More preferably, the curing is effectively carried out at a temperature above and around the N-I point of the light-control layer-forming mixture, i.e., at a temperature between the N-I point of the light-control layer-forming mixture and a temperature higher than that by 10° C.

In the thus produced liquid crystal device, an electric field is directly imposed onto the liquid crystal material unlike the conventional devices. Therefore, the device can be driven at a low voltage, exhibits a fast response time, and is applicable to a multiplexing drive system especially owing to its clear threshold voltage.

More specifically, while the conventional polymer-encapsuled type liquid crystal devices require a room mean square voltage of no less than 60 V, mostly no less than 100 V, for driving, the liquid crystal device according to the present invention shows a rise response time of 3 to 4 msec and a decay response time of 5 to 10 msec at a drive voltage mostly of from 10 to 50 V. It is a matter of course that a rapid rise cannot be expected when the rise time of the liquid crystal material itself is long due to its high viscosity.

The liquid crystal device of the present invention achieves a display having a contrast ratio of from 1:2 to 1:14, that is in no way inferior to that of the conventional polymer-encapsuled type liquid crystal devices, without paying any special attention to refractive indices in selecting the liquid crystal material and the transparent solid substance presumably because the proportion of the liquid crystal component to the transparent solid substance is high. In particular, formation of a transparent solid having a three-dimensional network structure by curing reaction of the polymerizable composition would be enough for achievement of such a high contrast because an optical interface of an appropriate form and size as demanded in relation to light wavelength can be formed thereby.

Moreover, since the liquid crystal material in the device of the invention turns to transparent at a temperature where it undergoes phase transfer to an isotropic liquid phase without applying an electrical voltage, due to selection of the liquid crystal material having an appropriate phase transfer temperature would make it possible to apply the device as a temperature-sensitive (temperature-responsive) light modulation device in a desired temperature range.

Figure 2:
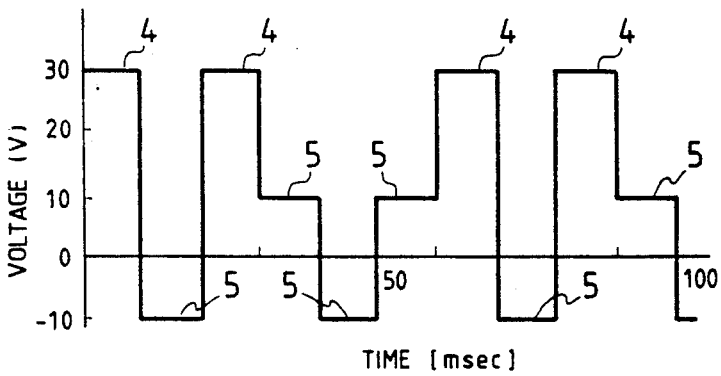
FIG. 2 is a graph of applied voltage vs. time in the liquid crystal device according to the present invention.
Figure 3:
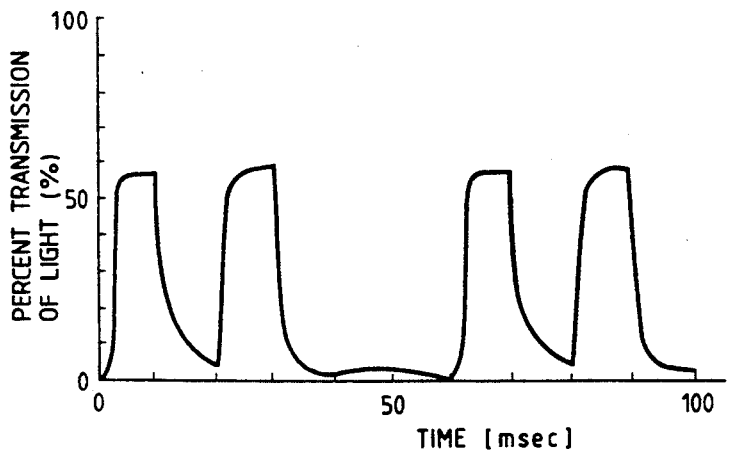
FIG. 3 is a graph of percent transmission vs. time under multiplexing in the liquid crystal device according to the present invention.

Referring to FIGS. 1 to 3, one example of the liquid crystal device produced by the process of this invention is illustrated below. FIG. 1 is a voltage (room mean square voltage, hereinafter the same) vs. transmission curve of the liquid crystal device produced by using a light-control layer-forming mixture containing a pyridine type liquid crystal composition (N-I point: 68.5° C.) and caprolactone-modified hydroxypivalic acid ester neopentylglycol diacrylate. The point indicated by numeral 1 is a threshold voltage ($V_{th}$=7.8 V). It can be seen that the percent transmission is substantially unchanged at an applied voltage between 0 V and 4 V, indicating existence of a clear threshold voltage. The point indicated by numeral 2 is a saturated voltage ($V_{sat}$=17.8 V), showing that the device can be driven at a lower voltage as compared with the conventional polymer-encapsuled type devices whose drive voltage is 60 V or higher. It is also apparent that the sharpness of the threshold voltage is improved over the conventional liquid crystal devices. The point 3 is a percent transmission (1.6%) with no voltage applied, demonstrating a superior light screening effect. The transparency of the liquid crystal device is saturated with the transmission being 85%. This transparency is equal to that of a transparent glass base. That is, the liquid crystal device of this example is capable of exhibiting a high contrast between percent transmissions of 1.6% and 85%. For reference, taking a comparative voltage vs. transmission curve of the conventional polymer-encapsuled type device [*Liq. Cryst.*, Vol. 146, 1-15 (1987)], a drive voltage is higher as having $V_{th}$ of 33 V and $V_{sat}$ of 75 V; the contrast is lower as having a percent transmission in a narrower range of from 2% to 64%; and the threshold voltage has no sharpness making multiplexing drive difficult. Thus, it can be easily understood that the liquid crystal device of the present invention is superior in performance in the multiplexing drive system.

FIGS. 2 and 3 show an applied voltage wave pattern and an optical response wave pattern of the liquid crystal device under multiplexing drive, respectively. A voltage was applied to the liquid crystal device with a pulse width of 10 msec, a ⅓ bias voltage, and a duty ratio of ½, and the optical responce wave pattern was observed. With the selected wave 4 being applied, the percent transmission rose to about 50%, while, with the non-selected wave 5 being applied, the percent transmission did not undergo sharp change. Therefore, the contrast ratio under the multiplexing drive is as high as 1:15, showing applicability to a multiplexing drive system. In addition, the responce time was high as having a rise time of 1 to 2 msec and a decay time of 3 to 5 msec, suggesting possibility to further increase the duty factor. Accordingly, it is obvious that the liquid crystal device of the present invention can be driven according to a multiplexing drive system that has been inapplicable to the conventional polymer-encapsuled type devices.

If desired, the liquid crystal device according to the present invention may further comprise segment electrodes, dot matrix electrodes, etc. on the bases and a ultraviolet light screening filter, an anti-reflection coating, etc. on the display surface. A color filter may be fitted on the image area or the whole display area.

The liquid crystal device in accordance with the present invention is a thin film device having a large display area which can be driven at a low voltage, exhibiting a high rate of response as having a rise time of from 3 to 4 msec and a high transparent-opaque contrast. As having a clear threshold voltage, it can be applied to a multiplex drive system. Therefore, the present invention makes it possible to easily carry out control of lighting, control of a visual field, and a large-sized display of letters or figures. In addition, the process according to the present invention produces such an excellent liquid crystal device with great ease.

The present invention is now illustrated in greater detail with reference to the following Examples, but it should be understood that the present invention is not deemed to be limited thereto. In these examples, all the percents and ratios are by weight unless otherwise indicated.

EXAMPLE 1

19.8% of trimethylolpropane triacrylate as a polymerizable compound, 0.2% of 2-hydroxy-2-methyl-1-phenylpropan-1-one as a polymerization initiator, and 80% of a nematic liquid crystal composition("DOX-4067" produced by Dainippon Ink & Chemicals, Inc.) were mixed, and a small amount of an alumina powder having an average particle size of 10 μm was added to the mixture as a spacer. The resulting mixture was inserted between a pair of ITO glass plates (20 cm×20 cm), and the unit was passed under a metal halide lamp (80 W/cm) at a speed of 3.5 m/min to cure the polymerizable compound. The irradiated ultraviolet energy corresponded to 500 mJ/cm². The electrode gap of the device was 12 μm.

When a voltage of 22 V (effective voltage, hereinafter the same) was applied to the resulting liquid crystal device, the rise time and decay time were 3 msec and 6 msec, respectively, and a contrast ratio was 1:14.

When the same procedure as described above was repeated, except for changing the proportion of the liquid crystal material to 83%, the device showed a rise time of 3 msec, a decay time of 3 msec, and a contrast ratio of 1:14 at an applied voltage of 17 V. Close examination of the cross-section of the light-control layer by means of a scanning electron microcope revealed a three-dimentional network of the polymer.

The refractive indices of the polymer separately prepared from the above-stated polymerizable compound and the liquid crystal material were 1.5211 and 1.5090, respectively.

The liquid crystal material "DOX-4067" used in this example had the following characteristics:

Cleaning point:60° C.
Melting point:−40°
Threshold voltage $V_{th}$:1.11 V
Y value:1.154
Birefringence $\Delta n$:0.175
Ordinary refractive index $n_O$:1.5090
Dielectric anisotropy
$\Delta\epsilon$:19.7
$\epsilon//$:26.4
$\epsilon\perp$:6.7
Viscosity (20° C.) $\eta$:33.8 cp

EXAMPLE 2

A mixture consisting of 20% of a 1:1 mixture of tricyclodecanedimethylol diacrylate and trimethylolpropane triacrylate as a polymerizable composition and 80% of a nematic liquid crystal composition ("DOX-4065" produced by Dainippon Ink & Chemicals, Inc.) was cured by ultraviolet irradiation in the same manner as in Example 1. The resulting liquid crystal device showed a rise time of 3 msec, a decay time of 6 msec, and a contrast ratio of 1:10 at an applied voltag of 22 V.

The liquid crystal composition "DOX-4065" had a liquid crystal temperature range of from 60.1 to −36° C., $V_{th}$ of 0.96 V, $\Delta n$ of 0.12, $\Delta\epsilon$ of 21.8, and $\eta$ of 55.7 cp (20° C.).

EXAMPLES 3 TO 6

A liquid crystal device was produced in the same manner as in Example 1, except for using caprolactone-modified hydroxypivalic acid ester neopentylglycol diacrylate ("HX-620" produced by Nippon Kayaku Co., Ltd.) as a polymerizable composition and a nematic liquid crystal composition ("DOX-4062" produced by Dainippon Ink & Chemicals, Inc.; liquid crystal temperature range:60.3° C. to −31° C.; $V_{th}$: 0.99 V, $n_O$:1.4970; $\Delta n$:0.140; $\Delta\epsilon$:22.7) in a proportion shown in Table 1 below and changing the electrode gap (cell thickness) to 20 μm. The performance characteristics of each of the resulting devices are shown in Table 1.

TABLE 1

| | Example 3 | Example 4 | Example 5 | Example 6 |
|---|---|---|---|---|
| Oligomer (%) | 40 | 30 | 20 | 15 |
| Liquid Crystal Material (%) | 60 | 70 | 80 | 85 |
| Applied Voltage (V) | 50 | 43 | 14 | 11 |
| Rise Time (msec) | 4 | 4 | 3 | 2 |
| Decay Time (msec) | 10 | 10 | 10 | 10 |

EXAMPLE 7

20% of a 1:1 mixture of N-vinylpyrrolidone and tris-(acryloxyethyl) isocyanurate as a polymerizable composition and 80% of a liquid crystal material "DOX-4062" were mixed, and an adequate amount of 2-methyl-2-[4-(methylthio)phenyl]-2-morpholinopropanone-1 was added thereto as a polymerization initiator. The mixture was cured in the same manner as in Example 1. The resulting device showed a low contrast ratio of about 1:2, but the drive voltage was extremely low as 7 V.

EXAMPLE 8

30% of neopentylglycolic acid-modified trimethylolpropane diacrylate as a polymerizable compound containing an adequate amount of 2-hydroxy-2-methyl-1-phenylpropan-1-one as a polymerization initiator and 70% of a liquid crystal material "DOX-4067" were mixed and cured in the same manner as in Example 1. The resulting device showed a rise time of 2 msec, a decay time of 10 msec, and a contrast ratio of 1:5 at a drive voltage of 62 V.

EXAMPLE 9

2 g of caprolactone-modified hydroxypivalic acid ester neopentylglycol diacrylate ("HX-620" produced by Nippon Kayaku Co., Ltd.; having a higher molecular weight than HX-220 hereinafter used) as a polymerizable compound, 8 g of a liquid crystal material "DOX-4062", and 1%, based on the polymerizable compound, of 2-hydroxy-2-methyl-1-phenylpropan-1-one ("Dalocure 1173" produced by Merck Co.) as a polymerization initiator were mixed, and a small amount of an alumina powder having an average particle size of 20 μm was added thereto as a spacer. The resulting mixture was inserted between a pair of ITO glass plates (50 cm×50 cm), and the unit was passed under a metal halide lamp (80 W/cm) at a speed of 3.5 m/sec to cure the polymerizable compound. The ultraviolet radiation energy applied was 500 mJ/cm².

The resulting liquid crystal device had milkiness but turned completely transparent on application of a voltage of 40 V. The ratio of percent transmission in the milky state to that of the transparent state (contrast ratio) was about 1:7.

EXAMPLE 10

A liquid crystal device was produced in the same manner as in Example 9, except for using 1.6 g of caprolactone-modified hydroxypivalic acid ester neopentylglycol diacrylate "HX-220" as a polymerizable compound, 8 g of a liquid crystal material "DOX-4062", and 0.4 g of butanediol thiopropionate as a chain transfer agent. The resulting device could be driven at a desired rate of response by application of a voltage of 16 V and showing a threshold voltage of 5 V.

EXAMPLE 11

15 g of a diacrylate of polyethylene glycol (molecular weight: 200) ("NK Ester A-200" produced by Shin Nakamura Kagaku Co., Ltd.) as a polymerizable compound, 5 g of trimethylol propanetris-β-thiopropionate as a chain transfer agent, 0.2 g of "Darocure 1173" as a polymerization initiator, and 80 g of a liquid crystal material "DOX-4062" were mixed, and an adequate amount of an alumina powder having an average particle size of 10 μm was added thereto as a spacer. The resulting mixture was inserted between two ITO electrode-fitted glass plates (20 cm×20 cm), and the unit was passed under a metal halide lamp (80 W/cm) at a speed of 2 m/min to cure the polymerizable compound. The irradiated energy was 800 mJ/cm².

The resulting liquid crystal device in the form of an opaque film became transparent on application of a drive voltage of 12 V. The rate of response was 3 msec in rise time and 15 msec in decay time, and the threshold voltage was between 2 V and 3 V.

EXAMPLE 12

18 g of a diacrylate of polypropylene glycol (average, molecular weight:400) ("NK Ester APG-400" produced by Shin Nakamura Kagaku Co., Ltd.) as a polymerizable compound, 2 g of butanediol thiopropionate as a chain transfer agent, 0.2 g of a polymerization initiator "Darocure 1173", and 80 g of a liquid crystal material "RO-571" (produced by Merck Co.) were mixed, and a small amount of an alumina powder having an average particle size of 20 μm was added thereto. The resulting mixture was coated between a pair of the same bases as used in Example 11 and cured by ultraviolet irradiation in the same manner as in Example 11.

The resulting liquid crystal device showed a rise time of 5 msec, a decay time of 30 msec, and a contrast ratio of 1:10 at a drive voltage of 26 V.

EXAMPLES 13 TO 25

A liquid crystal device was produced in the same manner as in Example 11, except for altering the composition of the light-control layer-forming mixture as shown in Table 2. Display characteristics of the resulting device are shown in Table 2.

TABLE 2

| Example No. | Polymerizable Compound (%) | | Chain Transfer Agent (%) | | Liquid Crystal Material (%) | | Drive Voltage (V) | Rise Time (msec) | Decay Ttime (msec) |
|---|---|---|---|---|---|---|---|---|---|
| 13 | HDDA[1] | (18) | BDTP[4] | (2) | RO-571 | (80) | 28 | 3 | 9 |
| 14 | " | (20) | — | | " | (80) | 40 | 5 | 14 |
| 15 | " | (17) | BDTP | (3) | " | (80) | 19 | 3 | 10 |
| 16 | " | (20) | — | | DOX-4062 | (80) | 45 | 5 | 15 |
| 17 | " | (18) | PETP[5] | (2) | " | (80) | 19 | 3 | 8 |
| 18 | HX-220 | (20) | — | | RO-571 | (80) | 37 | 5 | 12 |
| 19 | " | (30) | — | | DOX-4062 | (70) | 60 | 4 | 11 |
| 20 | " | (18) | BDTP | (2) | RO-571 | (80) | 16 | 3 | 10 |
| 21 | HX-620 | (18) | " | (2) | DOX-4062 | (80) | 10 | 3 | 12 |
| 22 | MANDA[2] | (19) | " | (2) | RO-571 | (80) | 11 | 4 | 11 |
| 23 | HX-620 | (8) | " | (2) | " | (90) | 7 | 3 | 11 |
| 24 | Viscoat 247[3] | (18) | TEGDM[6] | (2) | " | (80) | 10 | 4 | 12 |
| 25 | HDDA | (18) | EPTP | (2) | " | (80) | 15 | 4 | 11 |

Note:
[1] Hexanediol diacrylate
[2] Hydroxypivalic acid ester neopentylglycol diacrylate
[3] Neopentylglycol diacrylate (tradename)
[4] Butanediol thiopropionate
[5] Pentaerythritol tetrakis-β-thiopropionate
[6] Triethylene glycol dimercaptan

EXAMPLE 26

19.8 % of trimethylolpropane triacrylate as a polymerizable compound, 0.2% of 2-hydroxy-2-methyl-1-phenylpropan-1-one as a polymerization initiator, and 80% of a liquid crystal material (A) described below were mixed and cured by ultraviolet irradiation in the same manner as in Example 1. The electrode gap was 11 μm.

The resulting liquid crystal device had a threshold voltage and showed $V_{10}$ (defined below) of 8.0 V, $V_{90}$ (defined below) of 13.0 V, a contrast ratio of 1:20, a rise time of 2.5 msec, a decay time of 4 msec, and a number of multiplexing line $N_{max}$ (defined below) of 4.9.

Liquid Crystal Material (A):

Composition:

$C_2H_5$—(pyridine)—(phenyl)—CN    25%

$C_3H_7$—(pyridine)—(phenyl)—CN    30%

$C_5H_{11}$—(pyridine)—(phenyl)—CN    30%

$C_5H_{11}$—(phenyl)—(phenyl)—(pyridine)—CN    15%

Transition Temperature: 68.5° C. (N- I point) <−25° C. (C-N point)
Refractive Index:
 $n_e = 1.787$
 $n_O = 1.533$
 $\Delta n = 0.254$
Threshold Voltage $V_{th}$: 1.15 V
Viscosity (20° C.): 59 cp
Dielectric Anisotropy: 26.9

The number of multiplexing line $N_{max}$ can be obtained by equation:

$$N_{max} = [(\alpha^2 - 1)/(\alpha^2 - 1)]^2$$

wherein $$\alpha = V_{90}/V_{10}.$$

The percent transmission with no voltage applied being taken as 0%, and the maximum percent transmission reached by change of percent transmission with an increase of applied voltage being taken as 100%, the applied voltage attaining a percent transmission of 90% was taken as $V_{90}$, and that attaining a percent transmission of 10% was taken as $V_{10}$.

EXAMPLE 27

19.6% of caprolactone-modified hydroxypivalic acid ester neopentylglycol diacrylate as a polymerizable compound, 0.4% of 2-hydroxy-2-methyl-1-phenylpropan-1-one "Darocure 1173" as a polymerization initiator, and 80% of the liquid crystal material (A) as used in Example 26 were mixed. The N-I point of the resulting mixture was found to be 32° C. as measured by the use of a differential scanning calorimeter.

To the mixture was added a small amount of a fine glass fiber powder having an average particle size of 10 μm as a spacer, and the mixture was inserted between a pair of ITO glass plates (20 cm × 20 cm). The unit was heated to 40° C., and ultraviolet light having an intensity of 40 mW/cm² was uniformly irradiated on the entire surface of the glass to cure the polymerizable compound. The applied energy corresponded to 400 mJ/cm². The electrode gap was 11 μm.

The resulting liquid crystal device showed $V_{th}$ of 7.8 V, $V_{sat}$ of 17.8 V, a percent transmission with no voltage applied ($V_0$) of 1.6%, and a maximum percent transmission with a voltage applied ($V_{100}$) of 85%. When the device was driven by a ⅓ bias method at a duty factor of ⅓ with a pulse width of 10 msec, the contrast ratio was 1:15. Close examination of the cross-section of the light-control layer under a scanning electron microscope revealed a three-dimensional network of the polymer having a uniform mesh size of from 3.1 to 1.3 μm.

EXAMPLES 28 TO 38

A liquid crystal device was produced in the same manner as in Example 27, except for altering the composition of the light-control layer-forming mixture, the curing temperature, and the amount of applied UV energy as shown in Table 3. Performance characteristics of each of the resulting, devices were determined in the same manner as in Example 27, and the results obtained are shown in Table 3.

TABLE 3

| | Example No. | | | | | | | | | | |
|---|---|---|---|---|---|---|---|---|---|---|---|
| | 28 | 29 | 30 | 31 | 32 | 33 | 34 | 35 | 36 | 37 | 38 |
| Light-Control Layer: | | | | | | | | | | | |
| Liquid Crystal Material (%): | | | | | | | | | | | |
| (A) | 70 | — | 80 | 80 | — | — | — | — | — | — | — |
| RO-571[1] | — | 80 | — | — | 80 | 80 | 80 | 80 | — | — | — |
| DOX-4067 | — | — | — | — | — | — | — | — | 75 | 75 | 75 |
| Polymerizable Compound (%): | | | | | | | | | | | |
| HX-220 | 29.4 | 19.6 | — | — | — | — | — | — | — | — | — |
| C-2000[2] | — | — | 19.6 | — | 19.6 | — | 19.6 | — | — | — | — |
| C-9003[3] | — | — | — | — | — | 19.6 | — | — | 24.5 | — | — |
| PPGDA[4] | — | — | — | 19.6 | — | — | — | 19.6 | — | — | — |
| NPGFA[5] | — | — | — | — | — | — | — | — | — | 24.5 | — |
| MANDA | — | — | — | — | — | — | — | — | — | — | 24.5 |
| Darocure 1173 (%) | 0.6 | 0.4 | 0.4 | 0.4 | 0.4 | 0.4 | 0.4 | 0.4 | 0.5 | 0.5 | 0.5 |
| N-I Point (°C.) | 13 | 37.7 | 27.7 | 32.5 | 31.5 | 31.5 | 31.5 | 33.7 | 21.3 | 20.5 | 27.5 |
| Curing Condition: | | | | | | | | | | | |
| Temperature (°C.) | 20 | 45 | 35 | 40 | 33 | 33 | 40 | 40 | 25 | 25 | 31 |
| Applied Energy (mJ/cm²) | 150 | 120 | 200 | 200 | 200 | 200 | 220 | 220 | 120 | 120 | 120 |
| Performances of Device: | | | | | | | | | | | |
| $V_{th}$ (V) | 11.3 | 7.8 | 4.2 | 8.5 | 8.8 | 9.2 | 4.8 | 6.4 | 4.2 | 7.1 | 3.5 |
| $V_{sat}$ (V) | 24 | 20 | 18.3 | 24.7 | 29.7 | 31.8 | 19.7 | 20.5 | 17.7 | 25.5 | 14.8 |
| Percent Transmission: | | | | | | | | | | | |
| With no Voltage (%) | 11 | 4.0 | 10.3 | 4.3 | 3.0 | 5.0 | 11.0 | 7.0 | 27.0 | 22.0 | 32.0 |
| Maximum (%) | 85.2 | 85.4 | 82.0 | 80.6 | 77.0 | 75.0 | 77.0 | 83.0 | 85.0 | 81.0 | 83.0 |
| Contrast Ratio | 1:9 | 1:10 | 1:8 | 1:6 | 1:8 | 1:6 | 1:8 | 1:8 | 1:5 | 1:3 | 1:3 |

Note:
[1] A tradename of a nematic liquid crystal composition produced by N-I point = 64° C.; $V_{th}$ = 1.5 V; $\Delta n$ = 0.22; $n_O$ = 1.521; $\Delta\epsilon$ = 13.0.
[2] Long chain acrylated diol produced by Sartomer Co., Ltd.
[3] Polyleneoxide-modified neopentylglycol diacrylate produced by Sartomer Co., Ltd.
[4] Polypropylene glycol diacrylate (average molecular weight; 400)
[5] Polyolefin-modified neopentylglycol diacrylate While the invention has been described in detail and with reference to specific embodiments thereof, it will be apparent to one skilled in the art that various changes and modifications can be made therein without departing from the spirit and scope thereof.

What is claimed is:

1. A liquid crystal device comprising a pair of substrates, at least one of them being transparent, and a light-control layer supported between the substrates prior to curing, wherein said light-control layer after curing comprises a liquid crystal material showing positive dielectric anisotropy and a transparent solid substance, said liquid crystal material forming a continuous phase throughout the light-control layer, and said transparent solid substance existing in said liquid crystal continuous phase in the form of a solid three-dimensional network having a uniform mesh size and constituting a light-scattering interface within the liquid crystal continuous phase.

2. A liquid crystal device as claimed in claim 1, wherein said liquid crystal material is present in an amount of at least 60% by weight based on the light-control layer.

3. A liquid crystal device as claimed in claim 1, wherein said liquid crystal material is a nematic liquid crystal material.

4. A liquid crystal device as claimed in claim 2, wherein said liquid crystal material is a nematic liquid crystal material.

5. A liquid crystal device as claimed in claim 3, wherein said nematic liquid crystal material contains a compound represented by formula:

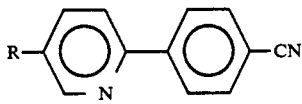

wherein R represents a straight chain alkyl group having from 1 to 10 carbon atoms,
and/or a compound of formula:

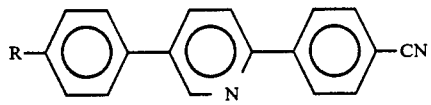

wherein R is as defined above.

6. A liquid crystal device as claimed in claim 4, wherein said nematic liquid crystal material contains a compound represented by formula:

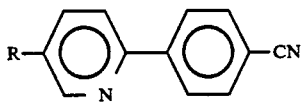

wherein R represents a straight chain alkyl group having from 1 to 10 carbon atoms,
and/or a compound of formula:

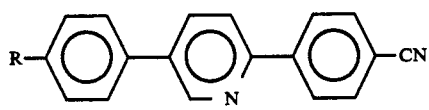

wherein R is as defined above.

7. A liquid crystal device as claimed in claim 1, wherein said liquid crystal material reversibly undergoes phase transition between a liquid crystal phase and an isotropic liquid phase with change of temperature to thereby reversibly change between a light-scattered opaque state and a transparent state.

8. A liquid crystal device as claimed in claim 1, wherein said liquid crystal material reversibly changes its molecule alignment with switching of applied voltage to thereby reversibly change between a light-scattered opaque state and a transparent state.

9. A liquid crystal device as claimed in claim 1, wherein said transparent solid substance comprises a synthetic resin.

10. A liquid crystal device as claimed in claim 1, wherein said light-control layer has a thickness of from 5 to 30 μm.

* * * * *